United States Patent
Lawton et al.

(10) Patent No.: US 11,620,811 B2
(45) Date of Patent: Apr. 4, 2023

(54) AUTOMATED MEASUREMENT OF POSITIONAL ACCURACY IN THE QUALIFICATION OF HIGH-ACCURACY PLOTTERS

(71) Applicant: The Boeing Company, Chicago, IL (US)

(72) Inventors: Robert Michael Lawton, Huntsville, AL (US); Craig S. Bosma, Madison, AL (US); Lindsay Leigh Waite Jones, Madison, AL (US)

(73) Assignee: The Boeing Company, Arlington, VA (US)

( * ) Notice: Subject to any disclaimer, the term of this patent is extended or adjusted under 35 U.S.C. 154(b) by 460 days.

(21) Appl. No.: 16/859,445

(22) Filed: Apr. 27, 2020

(65) Prior Publication Data

US 2021/0334577 A1    Oct. 28, 2021

(51) Int. Cl.
*G06V 10/75* (2022.01)
*G06K 9/62* (2022.01)
*G06V 10/25* (2022.01)

(52) U.S. Cl.
CPC ........... *G06V 10/753* (2022.01); *G06K 9/627* (2013.01); *G06V 10/25* (2022.01); *G06V 10/758* (2022.01)

(58) Field of Classification Search
CPC .... G06V 10/753; G06V 10/25; G06V 10/758; G06K 9/627
See application file for complete search history.

(56) References Cited

U.S. PATENT DOCUMENTS

| | | |
|---|---|---|
| 3,069,654 A | 12/1962 | Hough |
| 5,261,038 A | 11/1993 | Adroher et al. |
| 5,262,797 A | 11/1993 | Boeller et al. |
| 5,436,027 A | 7/1995 | Offer |
| 9,221,506 B1 | 12/2015 | Georgeson et al. |
| 2014/0320565 A1* | 10/2014 | Iton .......................... B41J 13/32 347/19 |
| 2018/0093418 A1* | 4/2018 | Lappas ................... G06T 19/00 |
| 2022/0134570 A1* | 5/2022 | Kawamata ................ G06T 7/74 700/259 |

* cited by examiner

*Primary Examiner* — David Perlman
(74) *Attorney, Agent, or Firm* — Ostrager Chong Flaherty & Broitman P.C.

(57) ABSTRACT

Systems and methods for assessing plotting device accuracy in aid of a process for qualifying plotter systems. The system and process involve an ideal (virtual) test pattern consisting of digital data defining a nominal grid augmented by geometric features (e.g., closed two-dimensional geometric shapes which respectively surround intersections or vertices of the nominal grid). The plotting device under test is commanded to print a test plot having a pattern that matches the test pattern, but the test plot may deviate from the test pattern. To measure the amount of deviation, first an image of the test plot on the printed medium is captured using an accurate optical scanner. Then a mathematical measurement process, implemented in a computer vision application (e.g., a software package), is employed to detect deviations of the test plot from the test pattern. A statistical analysis is then performed to determine whether the deviations are within specifications.

22 Claims, 16 Drawing Sheets

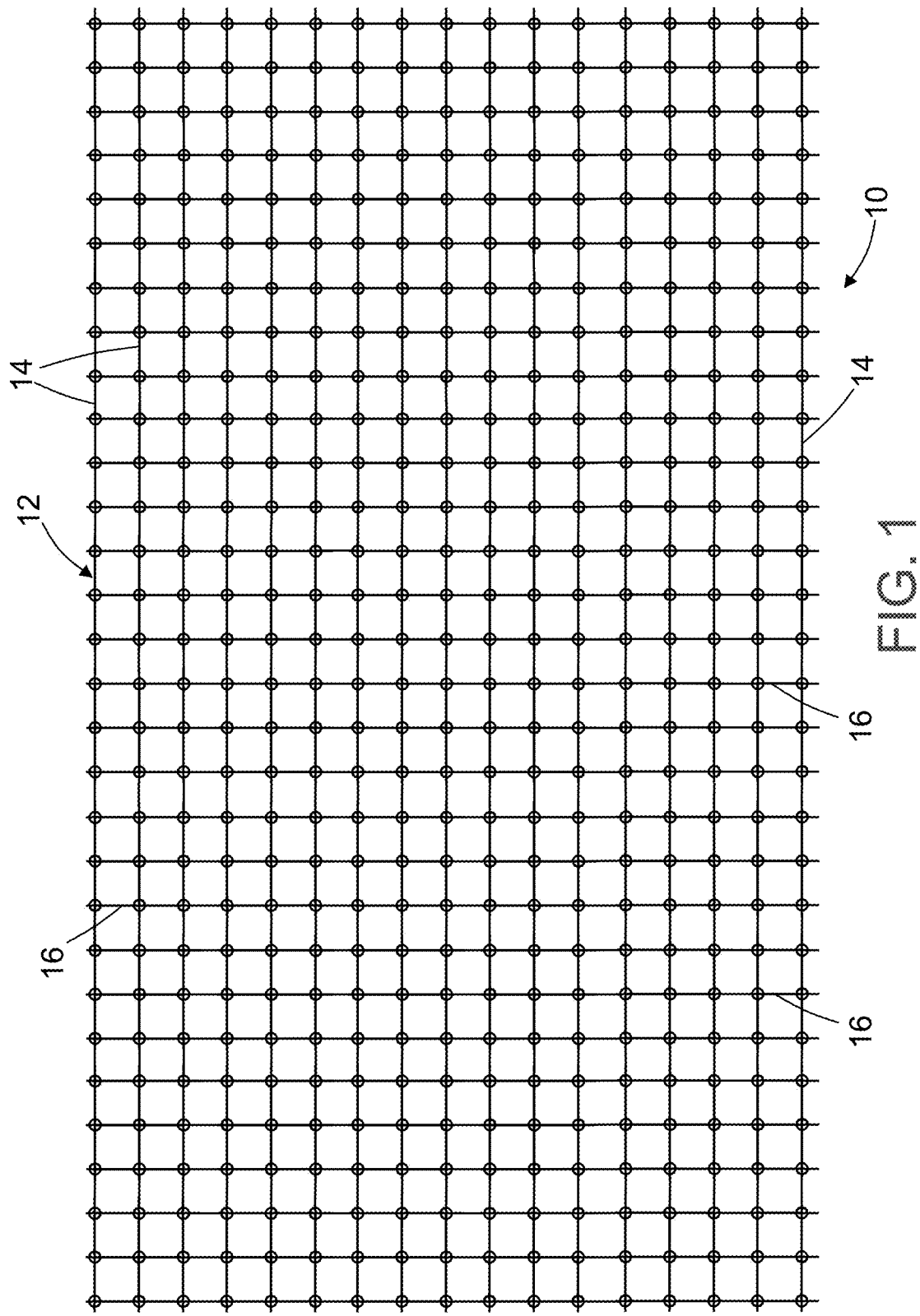

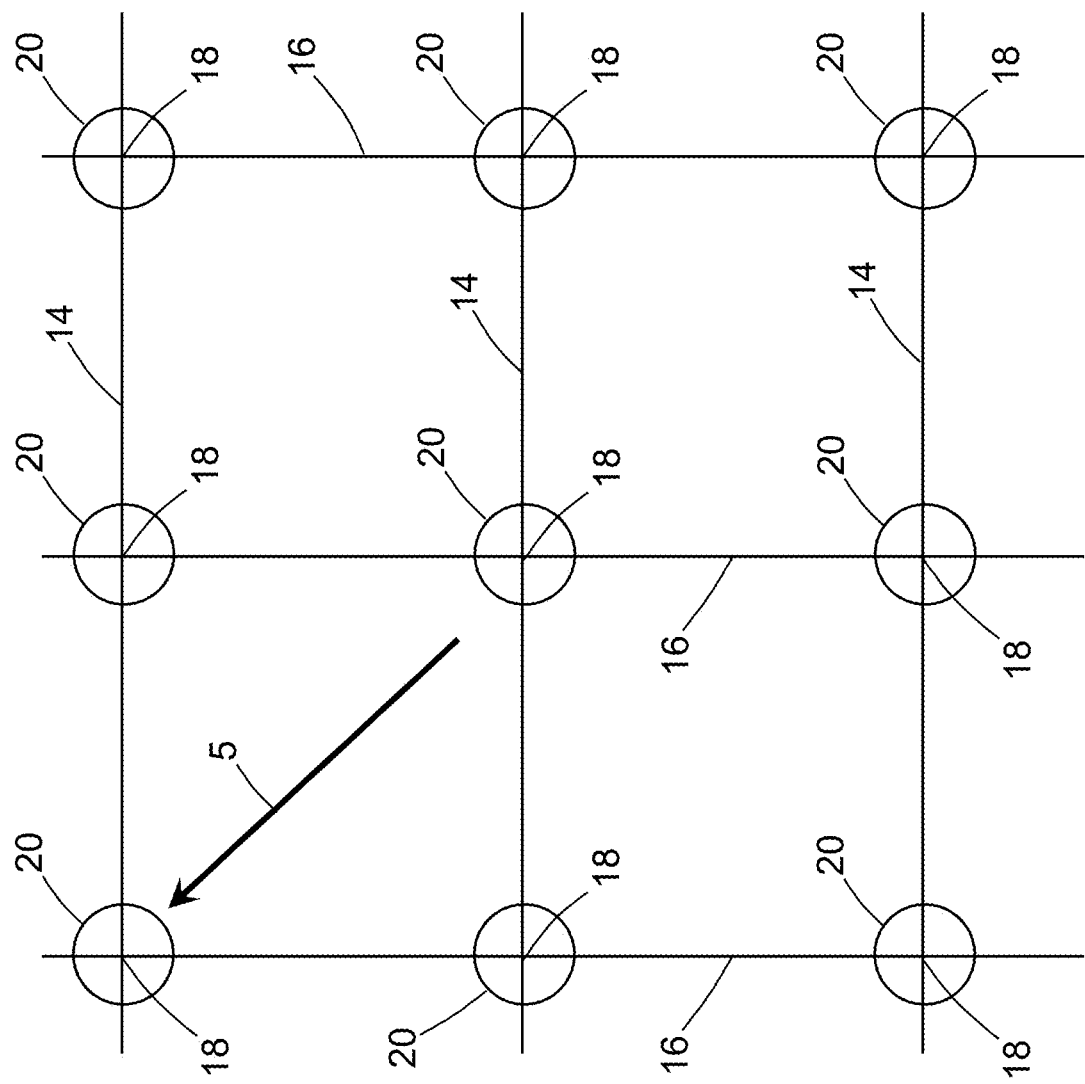

AUTOMATED MEASUREMENT OF POSITIONAL ACCURACY IN THE QUALIFICATION OF HIGH-ACCURACY PLOTTERS

BACKGROUND

This disclosure relates generally to techniques for measuring the positional accuracy of printers and plotters. In particular, this disclosure relates to systems and methods for measuring the positional accuracy of plotters used in the manufacture of aerospace components.

High-accuracy plotters are used in the aerospace industry for creating extremely accurate templates used in the fabrication of aircraft components. These templates are printed on plotting devices which typically use specialized media (e.g., Mylar with coatings that contribute to ease of movement through the plotter and to the adhesion of ink). Prior to usage, these plotter systems (consisting of both the plotting device and its specialized medium) are subjected to a rigorous qualification process. In particular, a plotter system may be qualified by demonstrating compliance with a pre-defined set of stringent plotter accuracy requirements (hereinafter "specifications"). Typically, the measurements required to qualify a plotter are made via a time-consuming and expensive manual inspection process involving a light table and a microscope.

Demonstrating that a plotter system meets the applicable plotter accuracy specifications is a burdensome process as it requires a great deal of testing. Particularly difficult among these requirements is that the plotting device be capable of achieving at least a specified threshold for positional accuracy. For example, one requirement (specified threshold) is that a plotted point must be within a specified distance (e.g., 0.02 inch) of its intended location. Demonstrating that this requirement is met with statistical confidence requires many careful high-accuracy measurements of the deviations of plotted points from their intended positions. Typically, measuring these small deviations from intended plotting locations is carried out by a trained technician using a light table and a microscope to measure distances between points in plots of a tailored test pattern (possibly with deviations) and a grid projected by the light table (which grid represents the standard test pattern without deviations). Making these measurements is a finicky and ergonomically taxing process. Even in ideal circumstances with a plotter system behaving excellently, demonstrating that positional accuracy requirements are met with any degree of statistical confidence can require hundreds or thousands of measurements, which is a burden on technicians. The cost of qualifying a plotter system can become excessive in terms of labor hours and ergonomic and eye strain on technicians. Another costly and time-consuming method of measuring plotter positional accuracy involves scanning and manual analysis (measurement) of scanned images using image-viewing software.

Given the onerous processes of quantifying the positional accuracy of a plotting device using current manual methods, an automated solution is highly desirable.

SUMMARY

The subject matter disclosed in some detail below is directed to systems and methods for the assessment of plotting device accuracy in aid of the process for qualifying plotter systems. In accordance with one embodiment, the system and process involve an ideal (virtual) test pattern (hereinafter "test pattern") consisting of digital data defining a nominal grid augmented by geometric features which respectively surround intersections or vertices of the nominal grid. The plotting device under test is commanded to print a test plot having a pattern that matches the test pattern, but the test plot may deviate from the test pattern. In order to measure the amount of deviation, first an image of the test plot on the printed medium is captured using an accurate optical scanner. Then a mathematical measurement process, implemented in a computer vision application (e.g., a software package), is employed to detect deviations of the test plot from the test pattern. A statistical analysis is then performed to determine whether the deviations are within specified qualifications (also referred to herein as "specifications").

The test pattern, when plotted without deviations, comprises: (a) a grid of lines which intersect at intersections to form squares or parallelograms or a grid of line segments which meet at vertices to form triangles or hexagons (hereinafter "nominal grid"); and (b) a multiplicity of geometric features which respectively surround the intersections or vertices of the nominal grid. The nominal grid may be characterized mathematically by a data structure consisting of a two-dimensional array (also referred to herein by the synonym "matrix") of coordinate pairs representing the specified locations of the intersections or vertices. As used herein, the term "geometric feature" should be construed to include a closed curved line or a closed chain of straight line segments or a pattern of radiating lines or a series of dots or any other geometric feature that makes identifying the rough location of the intersection or vertex readily apparent to the image processing. In accordance with one proposed implementation, the geometric features are circles. In alternative implementations, the geometric features may be one of the following types: ellipses, triangles, quadrilaterals, other polygons, radiating lines, and series of dots.

The plotter under test is commanded to print the test pattern, but the as-printed grid in the resulting test plot may deviate from the nominal grid. The qualification process proposed herein ensures that those deviations are within specified limits. The image processing component of the system proposed herein receives a captured image of the test plot and calculates (estimates) the distance by which the measured locations of intersections or vertices in the test plot deviate from their specified (intended) locations as defined by the test pattern. More specifically, the system measures the deviations of the measured locations of the centers of the intersections or vertices in the as-printed grid from the specified locations of the centers of the intersections or vertices in the nominal grid. In some example grids, the location data includes first and second coordinates of a center point of an intersection of two or three lines. In other example grids, the location data includes first and second coordinates of a center point of a vertex where three lines meet. For example, an intersection (vertex) location" may be characterized by X and Y coordinates located in a 2-D Cartesian coordinate system. In this context, the term "location" is a synonym for position in a 2-D coordinate system that serves as the frame of reference.

For embodiments in which the intersections or vertices are surrounded by circles, the test method comprises the following broadly characterized steps: (1) measuring the locations of centers of intersections or vertices in a test plot with high precision; (2) aligning a first array containing data representing the measured intersection (vertex) locations (hereinafter "measured locations") with a second array containing data representing specified intersection (vertex) locations (hereinafter "specified locations"), correcting for any small rotation of the test plot due to fixturing (securement) of the printing medium in the scanning process; and (3) measuring the pairwise positional differences between the measured locations and the specified locations.

Application of modern computer vision techniques for the analyses of plotter output and the use of a tailored test pattern enable automated measurement of positional accuracy. This automation enables a plotter qualification system that can acquire statistically meaningful numbers of measurements in seconds, making sound qualification feasible. Moreover, automating these measurements alleviates the need for burdensome manual measurements. The system proposed herein will accelerate and simplify the process of assessing positional accuracy of the plotting device during the evaluation and qualification of high-accuracy plotter systems.

Although various embodiments of systems and methods for using a computer vision system to measure the positional accuracy of a plotting device will be described in some detail below, one or more of those embodiments may be characterized by one or more of the following aspects.

One aspect of the subject matter disclosed in detail below is a method for measuring positional accuracy of a plotter, the method comprising: (a) defining a test pattern by generating digital data representing specified locations of centers of intersections or vertices of a nominal grid in a frame of reference; (b) printing a test plot that includes a printed grid having intersections or vertices at respective locations on a printing medium; (c) scanning the test plot to acquire a set of pixel data representing an image of the test plot on the printing medium; (d) selecting a subset of pixel data representing a region of the image which includes an intersection or vertex; (e) image processing the subset of pixel data to derive a measured location of a center of the intersection or vertex in the region in the frame of reference; and (f) calculating a pairwise positional deviation of the measured location from a corresponding one of the specified locations. In accordance with the embodiments, disclosed herein, the test pattern further comprises a multiplicity of geometric features which make identifying the rough location of the intersection readily apparent to the image processing. In some proposed implementations, the geometric features are closed 2-D geometric shapes (e.g., circles) that respectively surround the intersections or vertices of the nominal grid.

In accordance with one proposed implementation of the method described in the immediately preceding paragraph, step (e) comprises: finding a geometric feature using a Hough transform algorithm; finding the center of the intersection or vertex corresponding to the geometric feature by template matching an intersection- or vertex-shaped kernel to the pixel data in an area surrounding the center of the found geometric feature; and using interpolation to calculate coordinates of the location of the center of the intersection or vertex with subpixel resolution.

In accordance with one embodiment, steps (d) through (f) are repeated to produce a collection of calculated pairwise positional deviations for a multiplicity of intersections or vertices. This method further comprises subjecting the collection of calculated pairwise positional deviations to a statistical analysis which constructs a confidence interval regarding an estimated mean positional deviation.

Another aspect of the subject matter disclosed in detail below is a system for measuring positional accuracy of a plotter, the system comprising: an optical scanner configured to acquire a set of pixel data representing an image of a printed grid having intersections or vertices at respective locations on a printing medium; and a computer system which is communicatively coupled to receive the image from the optical scanner and programmed with image processing algorithms for calculating pairwise positional deviations of measured locations of the centers of intersections or vertices of the printed grid from specified locations of the centers of intersections or vertices of a nominal grid.

In accordance with one proposed implementation of the system described in the immediately preceding paragraph, a first one of the image processing algorithms is a Hough transform algorithm configured to find geometric features in the image; a second one of the image processing algorithms is a template matching algorithm configured to find the centers of the intersections or vertices using an intersection- or vertex-shaped kernel; and a third one of the image processing algorithms is a position interpolation algorithm configured to calculate coordinates of the measured location of the center of the intersection or vertex with subpixel resolution. The computer system is further programmed to perform a statistical analysis which constructs a confidence interval regarding an estimated mean positional deviation.

A further aspect of the subject matter disclosed in detail below is a method for measuring positional accuracy of a plotter comprising: (a) defining a test pattern by generating digital data representing specified locations of centers of intersections or vertices of a nominal grid in a frame of reference and further representing a multiplicity of geometric features which make identifying the rough location of the intersection readily apparent during image processing; (b) printing a test plot that includes a printed grid having intersections or vertices at respective locations on a printing medium and further includes the geometric features; (c) scanning the test plot to acquire a set of pixel data representing an image of the test plot on the printing medium; (d) selecting respective subsets of pixel data representing respective regions of the image which include a respective intersection or vertex; (e) image processing the subsets of pixel data to find respective geometric features in the image; (f) finding centers of respective intersections or vertices in the image by template matching an intersection- or vertex-shaped kernel to the pixel data in areas including the respective geometric features found in step (e); (g) using interpolation to calculate coordinates of the locations of the centers of the intersections or vertices found in step (f) with subpixel resolution in the frame of reference; and (h) calculating pairwise positional deviations of the measured locations from respective ones of the specified locations Other aspects of systems and methods for measuring the positional accuracy of a plotting device using computer vision technology are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale. In the flowcharts briefly described in this section, labeled rectangles indicate steps performed, while labeled parallelograms indicate data employed.

FIG. 1 is a diagram representing a portion of a test pattern having a multiplicity of intersections, each intersection being surrounded by a respective circle.

FIG. 2 is a diagram showing, on a magnified scale, a portion of the test pattern partly depicted in FIG. 1.

Reference will hereinafter be made to the drawings in which similar elements in different drawings bear the same reference numerals.

DETAILED DESCRIPTION

Figure 2A:
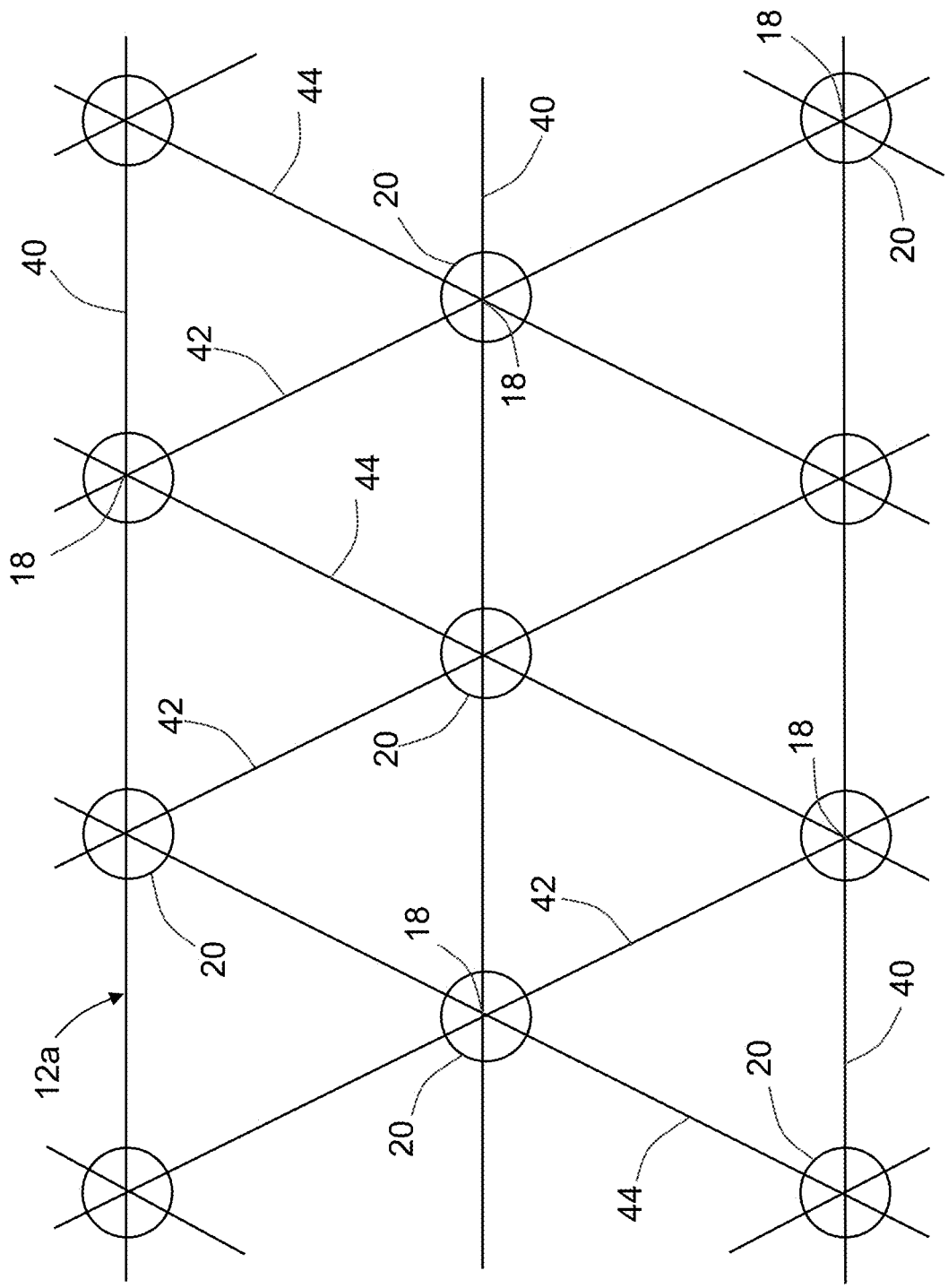
FIG. 2A is a diagram showing a portion of a test pattern that includes a triangular array of intersecting lines in accordance with an alternative embodiment.

Illustrative embodiments of systems and methods for measuring the positional accuracy of a plotting device using computer vision technology are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In accordance with various embodiments, the plotter qualification system and process proposed herein use a test pattern consisting of a nominal grid formed by lines or line segments having intersections or vertices which are surrounded by respective geometric features (e.g., circles). First, the plotter under test prints a test plot in response to a command to print the test pattern. Then an image of the test plot is captured using an accurate optical scanner. Thereafter, a mathematical measurement process, implemented in a computer vision application, is used to measure deviations of the as-printed locations (hereinafter "measured locations") of points in the test plot from the as-designed (intended) locations (hereinafter "specified locations") of corresponding points in the test pattern.

The test pattern is designed to make detection of locations of points in the printed grid by means of computer vision methods as easy as possible. FIG. 1 is a diagram representing a portion of an ideal test pattern 10 (without positional deviations) in accordance with one proposed implementation. The test pattern 10 shown in FIG. 1 (and shown on a magnified scale in FIG. 2) includes a nominal grid 12 consisting of a network of uniformly spaced horizontal lines 14 and vertical (perpendicular) lines 16 (also referred to herein as an "orthogonal grid") which intersect to form square tilings. In alternative embodiments shown in FIGS. 2A and 2B, the network of lines may be configured to form triangular or hexagonal tilings respectively.

FIG. 2 is a diagram showing, on a magnified scale, a portion of the test pattern 10 partly depicted in FIG. 1. As seen in FIG. 2, the horizontal lines 14 and vertical lines 16 intersect at intersections 18. In addition, the test pattern 10 includes a multiplicity of circles 20. Each intersection 18 is surrounded by a respective circle 20. In variations of this test pattern, a geometric feature different than a circle may be used. The center of each intersection 18 (hereinafter "intersection center") is collocated at the center of the surrounding circle 20. The arrow 5 in FIG. 2 represents an intersection 18 selected for manual measurement verification. Each intersection 18 and circle 20 form a respective intersection pattern 22. In one example implementation, the test pattern 10 is a 120-inch×34-inch regular 2-inch grid containing 1098 intersection patterns 22. In that example case, the test pattern 10 shown in FIG. 1 represents one-half of the test pattern 10.

FIG. 2A is a diagram showing a portion of a test pattern that includes a nominal grid 12a consisting of a triangular array of intersecting lines 40, 42, and 44 in accordance with an alternative embodiment. The lines 42, 44, and 46 intersect at intersections 18. Each intersection 18 is surrounded by a respective circle 20. In variations of this test pattern, a geometric feature different than a circle may be used.

Figure 2B:
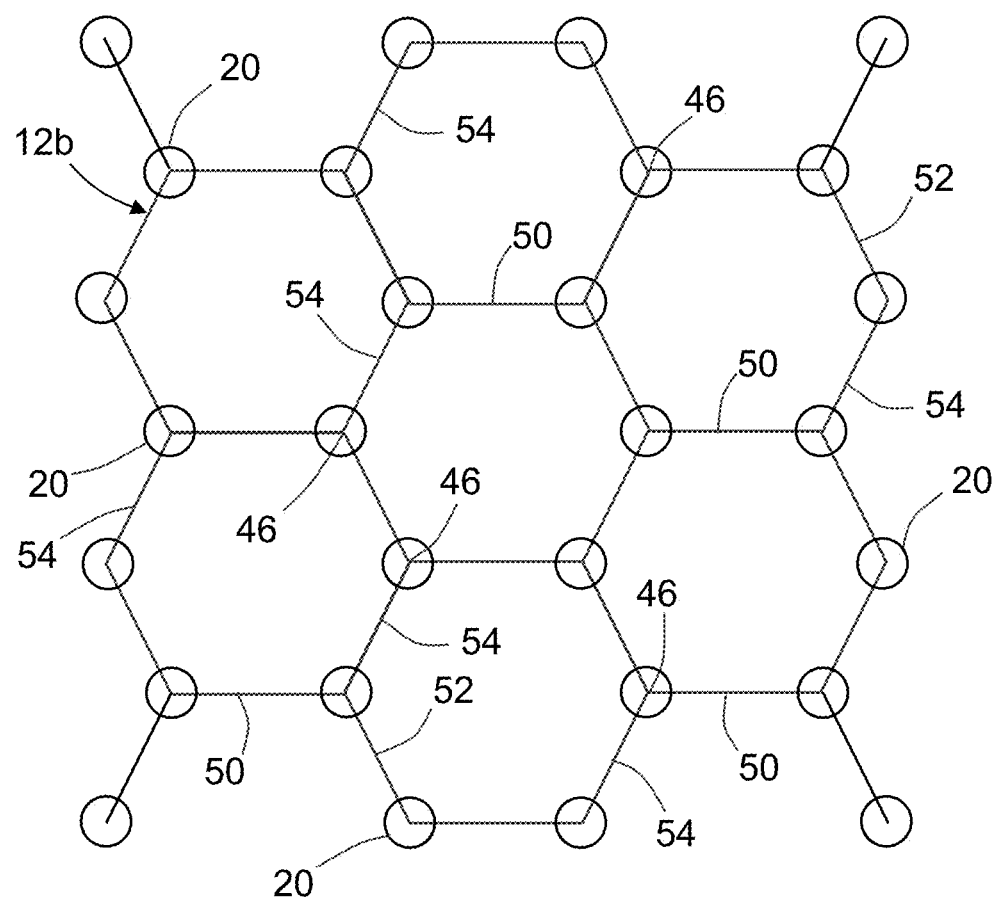
FIG. 2B is a diagram showing a portion of a test pattern that includes a hexagonal array of line segments which meet at vertices in accordance with another alternative embodiment.

FIG. 2B is a diagram showing a portion of a test pattern that includes a nominal grid 12b consisting of a hexagonal array of line segments 50, 52, and 54 which meet at vertices 46 in accordance with another alternative embodiment. Each vertex 46 is surrounded by a respective circle 20. In variations of this test pattern, a geometric feature different than a circle may be used.

Plotter positional accuracy is determined by comparing the printed locations of intersections or vertices in a test plot to their specified (intended) locations in the as-designed test pattern 10. Each circle 20 surrounding an intersection 18 or a vertex 46 aids in computer vision detection of the intersection or vertex.

The test pattern 10 is designed to cover the plot size that must be considered for plotter system qualifications and provides a large number of intersections 18 or vertices 46, which allows the technician to accumulate the large number of measurements of positional accuracy needed to demonstrate conformance to requirements with statistical confidence. Though the intent of the plotter qualification method proposed herein is primarily to reduce the measurement burden on technicians, having some manual measurements can provide a comparison and sanity check for any automated measurement system. In order to enable a comparison of manual measurements to the automated measurements derived by the plotter qualification system, the as-designed test pattern 10 contains a multiplicity (e.g., 13) labeled locations evenly dispersed throughout the plotting region. These locations are indicated by arrows pointing at the selected intersections in the test pattern (e.g., see arrow 5 in FIG. 2). These arrows are placed such that they do not interfere with the computer vision measurement process.

Figure 7:
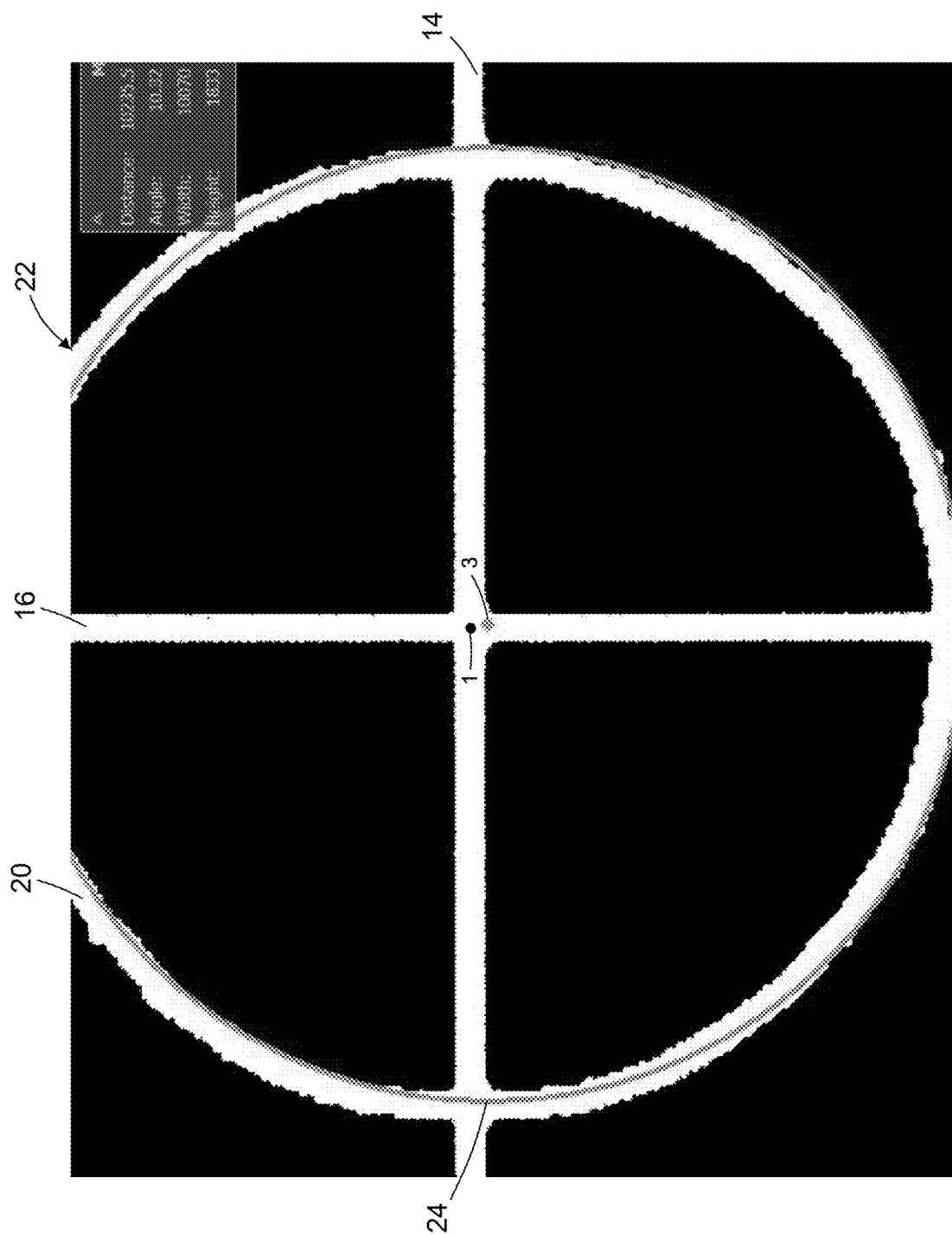
FIG. 7 is an image of an example of a result of circle detection using the Hough Transform. The circle detected by the transform is gray (it was green in the original color image) as is its center point.

The test pattern 10 consists of a regular nominal grid (e.g., respective nominal grids 12, 12*a*, and 12*b* shown in FIGS. 2, 2A, and 2B respectively) having a simple ideal regular geometry which makes comparison of the measured locations of points (the centers of the intersections, such as intersection center 1 in FIG. 7) in test plots produced by the plotting system to their intended locations relatively straightforward. Moreover, as shown in FIGS. 2, 2A, and 2B, each intersection 18 or vertex 46 in test pattern 10 is surrounded by a circle 20 of known diameter. As detecting circles is readily handled by standard computer vision methods, these circles 20 give finer resolution methods good starting points.

In accordance with one proposed implementation, the plotter qualification system detects circles using a Hough transform algorithm. The Hough transform is a feature extraction technique used in image analysis, computer vision, and digital image processing. The purpose of the technique is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform. The classical Hough transform was concerned with the identification of lines in the image, but later the Hough transform was extended to identify positions of arbitrary shapes, most commonly circles or ellipses.

In accordance with the embodiments disclosed in some detail below, ideal test pattern 10 is a mathematical abstraction defined by digital data stored in a test pattern file. In accordance with one proposed implementation, the digital data in the test pattern file includes a listing of coordinate pairs indicating the specified (as-designed) locations of intersections in a nominal grid. The listing of specified locations is converted into a 2-D array (a.k.a. matrix) of specified locations (hereinafter "nominal grid array"). The image of the test plot is converted into a 2-D array of coordinate pairs indicating the measured locations of the intersections or vertices in the test plot. The 2-D array of measured locations (hereinafter "measured locations array") has a format that matches the format of the nominal grid array to facilitate correlating the two arrays of data for the purpose of computing positional deviations.

One embodiment of a computer vision measurement algorithm will now be described with reference to the flowcharts shown in FIGS. 3-6 and 8. The following detailed description will assume that the test pattern 10 has a nominal grid 12 of the type shown in FIGS. 1 and 2. However, it should be appreciated that the measurement procedure described in some detail below is equally applicable to test patterns having other nominal grids, such as nominal grids 12*a* and 12*b* shown in FIGS. 2A and 2B respectively. The plotter qualification system proposed herein automates the assessment of positional accuracy in plots of the test pattern 10 through a series of steps.

Figure 3:
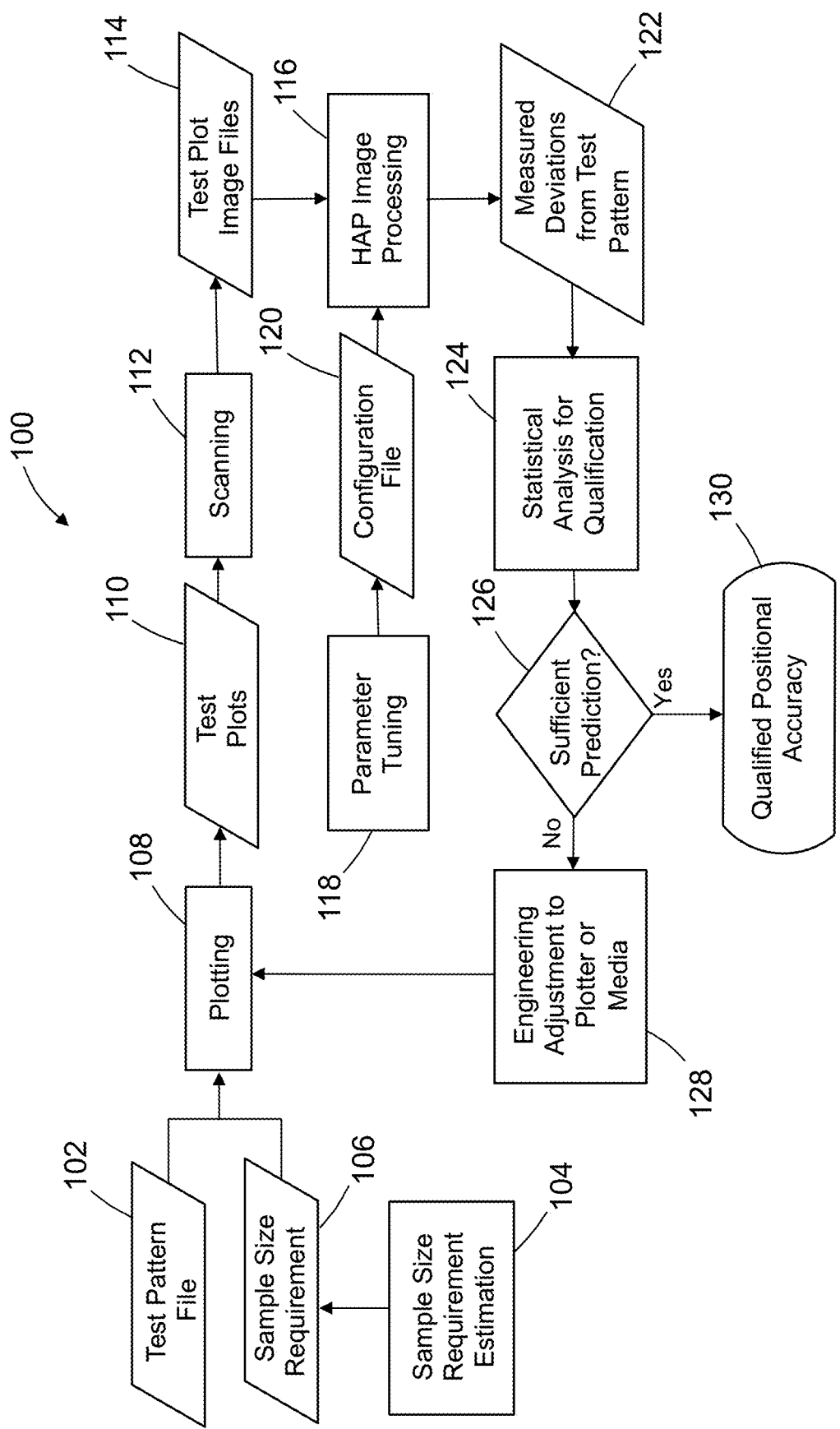
FIG. 3 is a flowchart identifying steps performed and data employed by a generalized process for assessing the positional accuracy of a plotter system in accordance with one embodiment of the computer vision process proposed herein.

FIG. 3 is a flowchart identifying steps of a generalized computer vision process 100 for assessing the positional accuracy of a plotter system in accordance with one embodiment. The mathematical abstraction of test pattern 10 is recorded as digital data in a test pattern file 102, which file is stored in a non-transitory tangible computer-readable storage medium (e.g., random access memory in the computer that is programmed to execute the computer vision process 100). The first step 104 in the process is determining (estimating) the sample size requirement 106 to demonstrate a specific positional accuracy requirement with a desired degree of confidence. For example, a process specification might demand that the plotter system have a positional accuracy of ±0.02 inch with 95% confidence. Assuming a normal distribution for positional error, one can derive the number of observations that would be needed to demonstrate that this requirement is met by a conforming plotter system.

The sample size requirement 106 drives the number of instances of test plots 110 that must be printed on respective print media in plotting step 108. Next the test plots 110 are scanned (step 112) using a high-accuracy optical scanner, resulting in a collection of very large digital test plot image files 114. The test plot image files 114 are sent to a high-accuracy plotting (HAP) image processing application, which is configured to measure the small deviations of locations of the multiple intersections per test plot from their nominal locations. The HAP image processing (step 116) depends on a number of configurable parameters that must be tuned in an offline, upfront parameter tuning step 118. The tuned parameter values are stored as digital data in a configuration file 120 which is readable by the HAP image processing application prior to processing the test plot image files 114.

Once the deviations of measured locations of intersections in the test plot 110 from intended (nominal) positions indicated by the test pattern 10 have been measured, the measured deviations 122 are subjected to a statistical analysis for qualification (step 124). More specifically, the statistical analysis step 124 constructs a confidence interval about the estimated mean deviation. A determination is then made whether this estimate (prediction) of mean deviation and its associated confidence interval are sufficient to satisfy the positional accuracy requirement or not (step 126). The positional accuracy requirement may be, for example, a requirement for the plotter to achieve at least a specified threshold (or dimensional tolerance range) for positional accuracy for a plotted point of a test plot, which point must be within a specified distance threshold (e.g., within 0.01 inch of its intended position or location). If a determination is made in step 126 that the prediction is sufficient and that the plotted point of the test plot is within the specified threshold or tolerance range, then the plotter under test is categorized as having qualified positional accuracy 130. If a determination is made in step 126 that the prediction is not sufficient, then the plotter system or medium requires engineering adjustment (step 128) to drive conformance to the specification. Following the engineering adjustments, a new series of test plots may be printed and the above-described qualification process is repeated for those new test plots. Where the system for measuring positional accuracy of a plotter (including the optical scanner and computer system) verifies that the positional accuracy and dimensions of a test plot (of a test pattern file comprising data that includes specified locations of intersections in a grid, points and circles) that is produced by the plotter system is within the specified threshold or dimension tolerance range, the plotter system that yields such a test plot within the specified threshold for positional accuracy is assigned a qualification for plotting aircraft part templates. Upon assigning a qualification for plotting aircraft parts, the system for measuring positional accuracy of a plotter is further configured for utilizing the plotter system to thereafter send a part template file to the plotter system and use the qualified plotter system to plot an aircraft template part on the qualified plotter system.

Before the plotter qualification system can be applied to a given application, the various configurable parameters associated with our computer vision process must be determined (tuned) in parameter tuning step 118 (see FIG. 3). Deciding upon values for these configurable parameters can either consist of a formal optimization or a less formal manual process. In either case, the general process 200 of deciding upon these parameters is outlined in FIG. 4, which identifies steps performed and data employed by an offline upfront process for generating tuning configurable parameters that may be used in the computer vision process partly depicted in FIG. 3.

Figure 4:
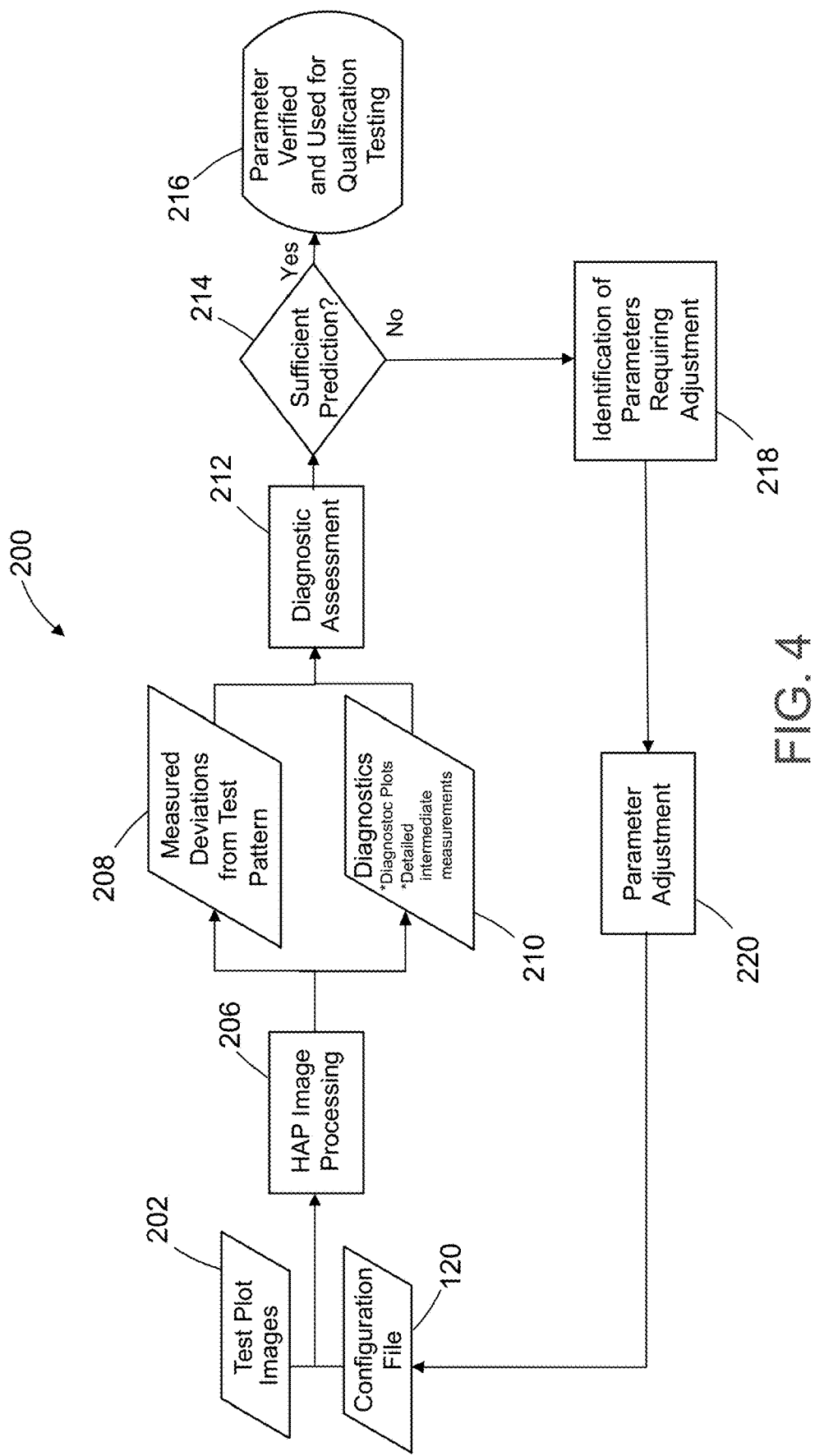
FIG. 4 is a flowchart identifying steps performed and data employed by an offline upfront process for generating tuning configurable parameters that may be used in the computer vision process partly depicted in FIG. 3.

As seen in FIG. 4, the off-line parameter tuning process uses preliminary test plot image files 202 and a current version of a configuration file 120 (containing digital data representing a current set of tuning parameters) are utilized in a separate HAP image processing step 206 which is configured to output measured deviations 208. The measured deviations 208 are then assessed in diagnostic assessment step 212 using various diagnostics 210 (including diagnostic files and detailed intermediate measurements). Some examples of diagnostics that might be used in tuning of configurable parameters include the following: (a) plots indicating performance of individual image processing algorithms (such as the plots presented FIGS. 9, 9A, and 9B, described in some detail below); (b) tables of intermediate results such as centers and radii of circles identified via Hough transform; (c) other metrics of individual image processing algorithms (measures of goodness of fit or convergence in the case of iterative image processing algorithms); and (d) times required for processing steps (some combinations of configurable parameters can cause image processing pipeline processing times to become untenably long).

Following the diagnostic assessment, a determination is made whether the current parameters produce a prediction sufficient to satisfy the positional accuracy requirement or not (step 214). If a determination is made in step 214 that the prediction is sufficient, then the current parameters in current configuration file 120 are verified and used for qualification testing (step 216). If a determination is made in step 214 that the prediction is not sufficient, then current parameters requiring adjustment (tuning) are identified (step 218). The parameters are adjusted (tuned) in step 220. The adjusted parameters are then stored in the configuration file 120. The new current parameters are then applied to a new set of test plots for off-line HAP imaging processing (step 206) and diagnostic assessment (step 212).

The HAP image processing component (step 116 in FIG. 3) of the system measures the deviations of measured locations of intersections 18 in the test pattern 10 (see FIGS. 1 and 2) from their intended locations in three broadly characterized steps: (1) measuring the locations of centers of intersections or vertices in a test plot with high precision; (2) aligning a first array containing data representing the measured locations with a second array containing data representing the specified locations, correcting for any small rotation of the test plot due to fixturing (securement) of the printing medium in the scanning process; and (3) measuring the pairwise positional differences between the measured and specified locations after applying the rotation in step (2).

Figure 5:
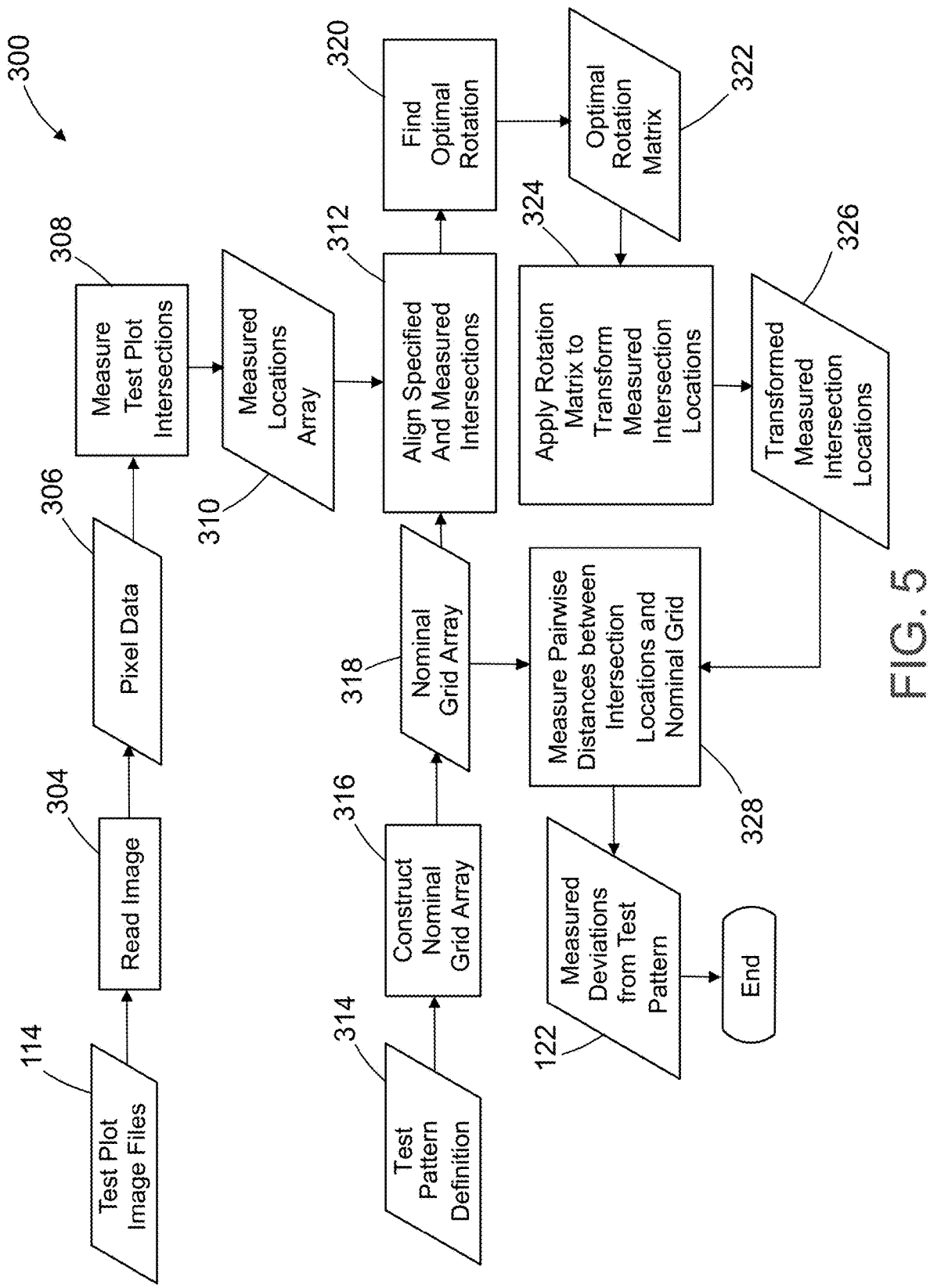
FIG. 5 is a flowchart identifying steps performed and data employed by a process for measuring differences between as-printed intersection locations in the test plot and as-designed intersection locations in the test pattern partly shown in FIG. 1 in accordance with one proposed implementation.

FIG. 5 is a flowchart identifying steps performed and data employed by a positional deviation measuring process 300 for measuring differences between locations of as-printed intersections in a test plot and as-designed intersection locations in the nominal grid 12 in accordance with one proposed implementation. Pixel data 306 in test plot image file 114 is read (step 304). The retrieved pixel data 306 is used to measure the locations of intersections in the test plot (step 308). The measured locations are then organized in a 2-D measurement location array 310. The measured locations in the measurement location array 310 are then aligned with specified locations using translation (step 312). The specified locations are read from a file containing a nominal grid array 318. The nominal grid array 318 is constructed in step 316 using information from a test pattern definition 314. For example, the test pattern definition 314 includes a listing of coordinate pairs of specified locations.

The Kabsch algorithm is then used to find an optimal rotation matrix 322 (step 320). The measured locations are then transformed by multiplying the translationally aligned measurement location array 310 by the optimal rotation matrix 322, thereby rotating the measurement location array 310 to fully align with the nominal grid array 318. The resulting array contains the transformed measured locations 326. In step 328, pairwise positional deviations of the transformed measured locations 326 of the centers of the intersections of the printed grid from the specified locations of the centers of intersections or vertices of the nominal grid are calculated (measured) to generate the measured deviations 122 from the test pattern.

Measuring the locations of intersections (step 310 in FIG. 5) in digital scans of the plotted test pattern is itself a three-step process. These steps are finding the circles surrounding each intersection, getting an estimate of intersection centers via template matching using a custom kernel, and refining this estimate via interpolation to a finer grid. These steps enable the system to go from very rough first guesses about the location of intersection centers all the way to very refined, subpixel precision estimates.

Figure 6:
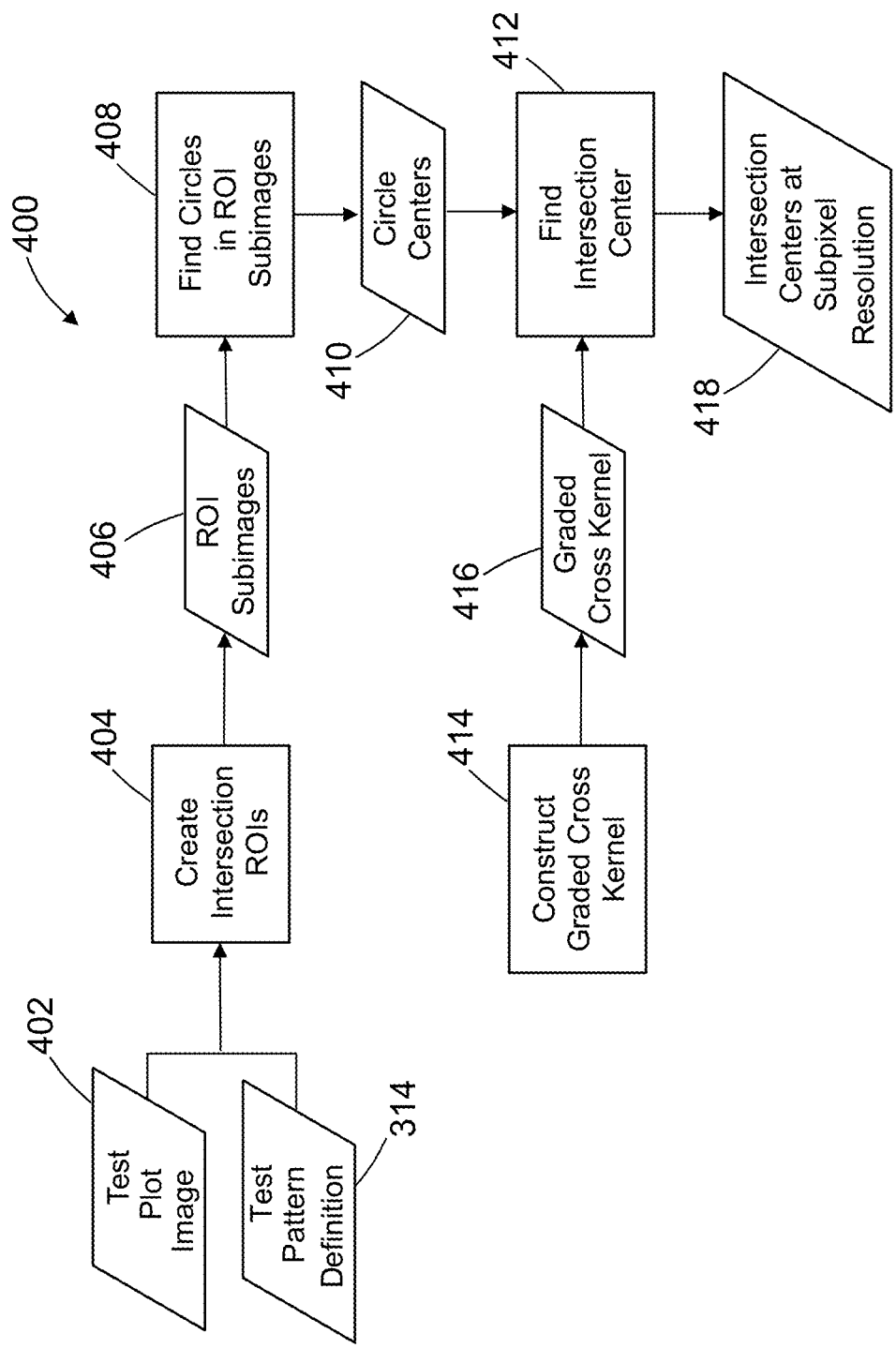
FIG. 6 is a flowchart identifying steps performed and data employed by a process for measuring as-printed intersection locations used in the computer vision process partly depicted in FIG. 3.

FIG. 6 is a flowchart identifying steps performed and data employed by an intersection location measuring process 400 for measuring as-printed intersection locations used in the positional deviation measuring process 300 partly depicted in FIG. 3. In the first step of measuring as-printed locations of intersections in a test plot image 402, the test pattern definition 314 is used to select (extract) a subset of pixel data representing a Region of Interest (ROI) subimage 406 which is roughly centered on the intersection of interest (step 404). Although the system does not know the exact locations of the intersections at this stage in the process, the system is able to coarsely locate the intersection based on the test pattern definition 314. That information is used to narrow down the search for the first 2-D geometric shape to be detected via computer vision, namely, the circles 20 surrounding each intersection 18 in FIG. 2. Doing this in ROI subimages 406 vastly reduces the number of pixels that have to be searched for circles. Using Hough transform circle detection, the computer vision system finds a respective circle 20 in each ROI subimage 406 and calculates the circle center 410.

The Hough transform was disclosed in U.S. Pat. No. 3,069,654 as a means for machine recognition of complex lines in photographs or other pictorial representations. In particular, U.S. Pat. No. 3,069,654 disclosed a method for recognizing particle tracks in pictures obtained from a bubble chamber by detecting straight lines. A linear Hough transform algorithm uses a 2-D array, called an accumulator, to detect the existence of a line. The Hough transform algorithm may be altered to detect circular shapes instead of straight lines. First, an accumulator space, which is made up of a cell for each pixel, is created. Initially each cell is set to 0. For each edge point (i, j) in the image, all cells which, according to the equation of a circle $(i-a)^2+(j-b)^2=r^2$, could be the center of a circle are incremented. These cells are represented by the letter a in the equation. For each possible value of a found in the previous step, the Hough transform algorithm finds all possible values of b which satisfy the equation. The Hough transform algorithm then searches for local maxima in the accumulator space. These cells represent circles that were detected by the algorithm.

An example of this sort of circle detection is given in FIG. 7, which is an image of an example of a result of circle detection using the Hough transform. The circle 24 detected by the Hough transform is gray (it was green in the original color image), as is its center point 3 (in the shape of a diamond). Note that the circle 24 is off-center from the circle 20 (depicted in white in FIG. 7) as it detected both the inner and outer edges of the white circle. This positional deviation indicates circle detection using a Hough transform algorithm is not perfect. Although the estimated location of the circle center 3 of the detected circle 24 provides a nice starting guess about the location of the intersection center 1, it would be a bad final estimate as it is slightly off-center. The center of a circle detected in this step acts as a starting point for the following step 412 (see FIG. 6) that finds the center of the intersection 18 which is surrounded by the white circle 20.

After the location 3 of the center of the detected circle 24 has been calculated, the center of the associated intersection 18 is found in step 412 using a template matching process. As seen in FIG. 6, the intersection location measuring process 400 further includes the step 414 of constructing a graded cross-shaped kernel 416 and then sliding that kernel across a smaller subset of the pixel data in the current ROI subimage representing the area surrounding the center of detected circle 24 found in step 408. In this example, the graded cross-shaped kernel 416 matches the cross-shaped intersection 18 of the example orthogonal grid. It should be appreciated, however, that the shape of the kernel will be different for triangular grid 12a shown in FIG. 2A and hexagonal grid 12b shown in FIG. 2B.

More specifically, the template matching comprises correlating the graded cross-shaped kernel 416 with a sliding window of the pixel data in the ROI subimage being processed. Template matching is a very common computer vision technique which finds regions of an image that are similar to a template image. Template matching is a technique for finding areas of an image that match (are similar) to a template image (kernel). The successive pixel data windows are compared to the kernel until a satisfactory match for the kernel is found. The goal is to detect the highest matching area. To identify the matching area, the computer has to compare the kernel against each pixel data window by sliding it. The term "sliding" as used herein means moving the kernel one pixel at a time (left to right, up to down). At each location, a metric is calculated which represents how "good" or "bad" the match at that location is (or how similar the kernel is to that particular area of the ROI subimage). The brightest locations indicate the highest matches. In practice, the well-known function minMaxLoc may be used to locate the highest value in the resulting array. The function minMaxLoc finds the minimum and maximum element values and their positions using various configurable parameters. For each location of the kernel over the pixel data, a resulting metric is computed and stored in a resulting metric array. Each location in the resulting metric array contains a respective match metric corresponding to a different relative position of the kernel.

In the computer vision application proposed herein, a custom kernel is used to refine the initial coarse estimates of the locations of the intersection centers. The expectation is that the location of the pixel where the metric value in the resulting metric array is maximum will be the center of the intersection at pixel resolution. However, since the qualification process should measure the location of intersection centers with very high precision, the image processor interpolates the resulting metric array to a finer grid in order to obtain an estimate at subpixel resolution. Interpolation to subpixel resolution is an important step as the accuracy of a location specified in pixel coordinates of an image is limited by pixel size. For example, in pixel coordinates the location of one of intersection might be (755, 936), while interpolation to subpixel resolution might yield a location of (755.432, 936.270). As high-accuracy plotters are subject to stringent accuracy requirements, this additional precision is valuable.

Figure 8:
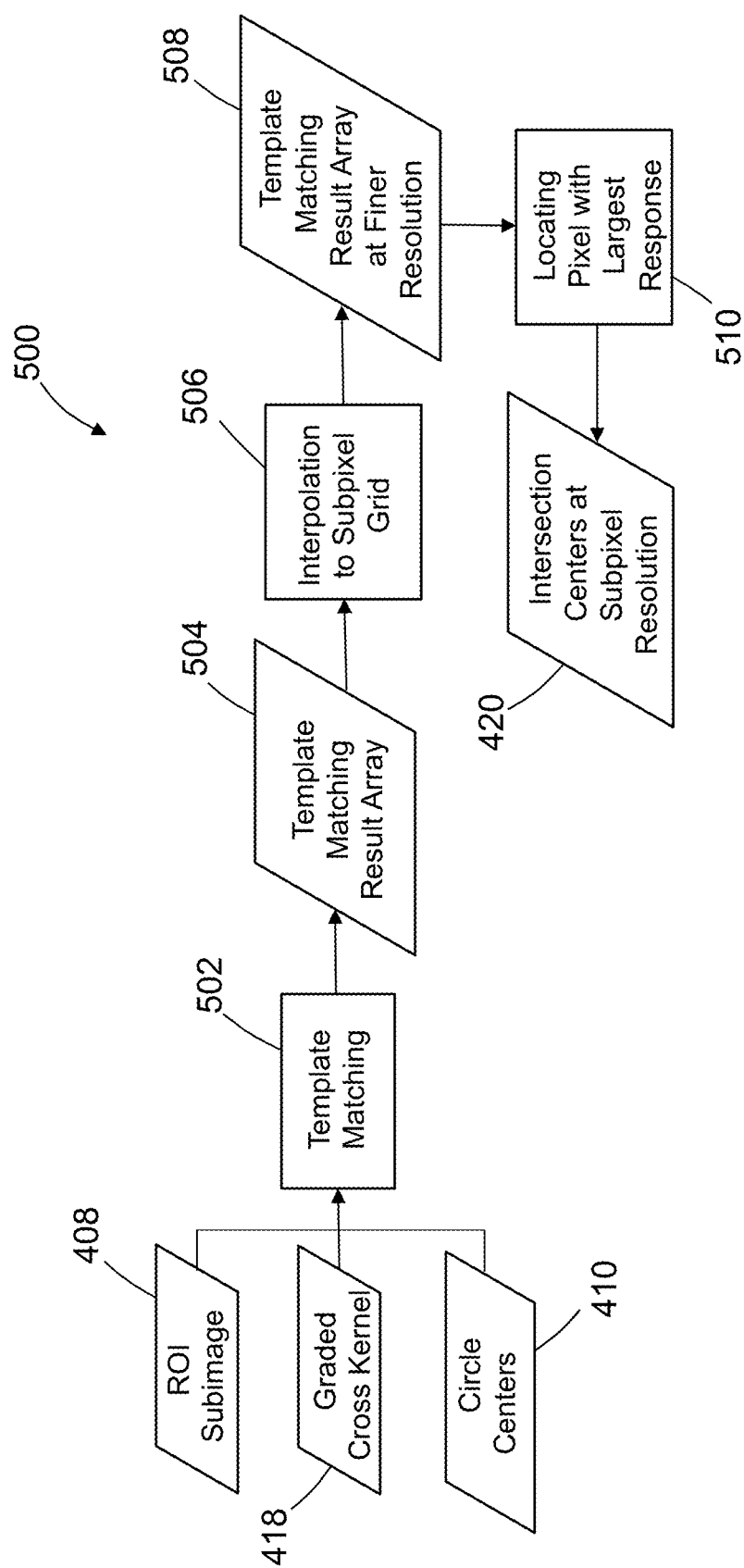
FIG. 8 is a flowchart identifying steps performed and data employed by a process for template matching and interpolation of the resulting array in accordance with one proposed implementation.

FIG. 8 is a flowchart identifying steps performed and data employed by a process 500 for template matching (step 502) and interpolation (step 504) in accordance with one proposed implementation. The template matching step 502 uses the circle centers 410, the graded cross kernel 418 and the ROI subimage 408 to produce a template matching resulting array 504. The neighboring values of the pixels surrounding the pixel corresponding to the maximum metric value are then interpolated to a subpixel grid (step 506) to produce a finer-resolution template matching result array 508. Then the pixel with the largest response in the finer-resolution template matching result array 508 is located and the coordinates of the location of the intersection center are calculated to produce the location of the intersection center at subpixel resolution in the frame of reference. A similar process applies in cases where the printed grid includes vertices instead of intersections.

Figure 9A:
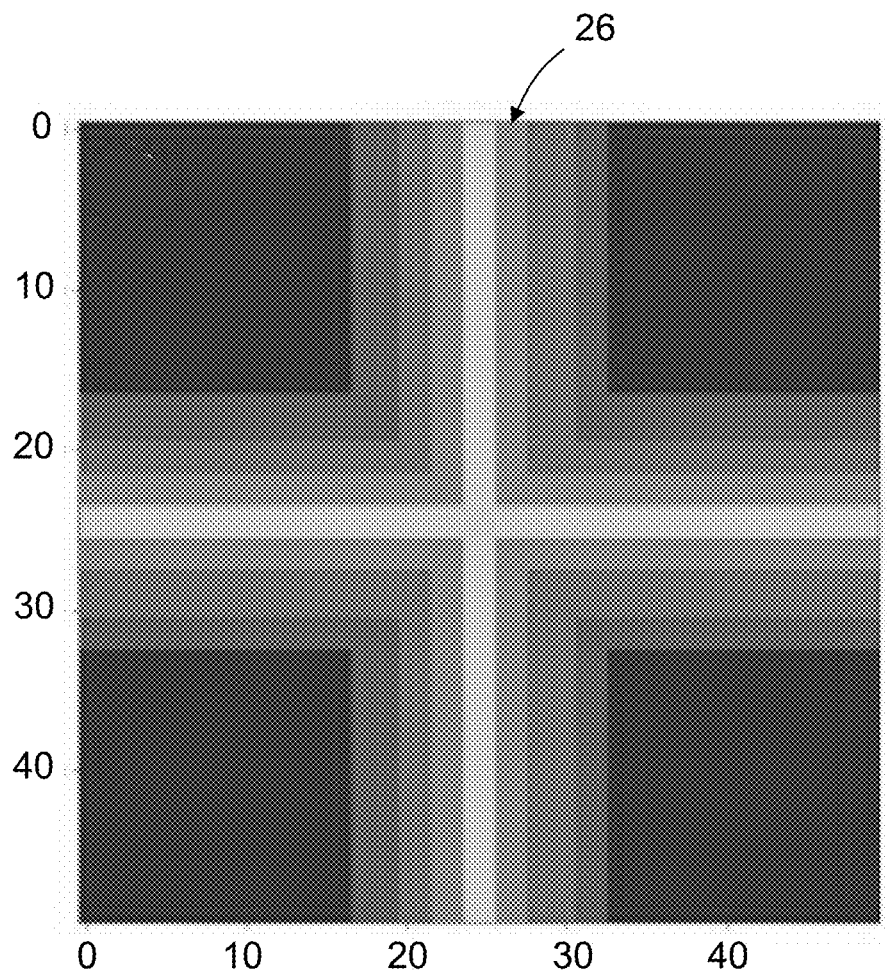
FIG. 9A is an image of a custom kernel used in the template matching step of the process for measuring locations of intersection centers.
Figure 9B:
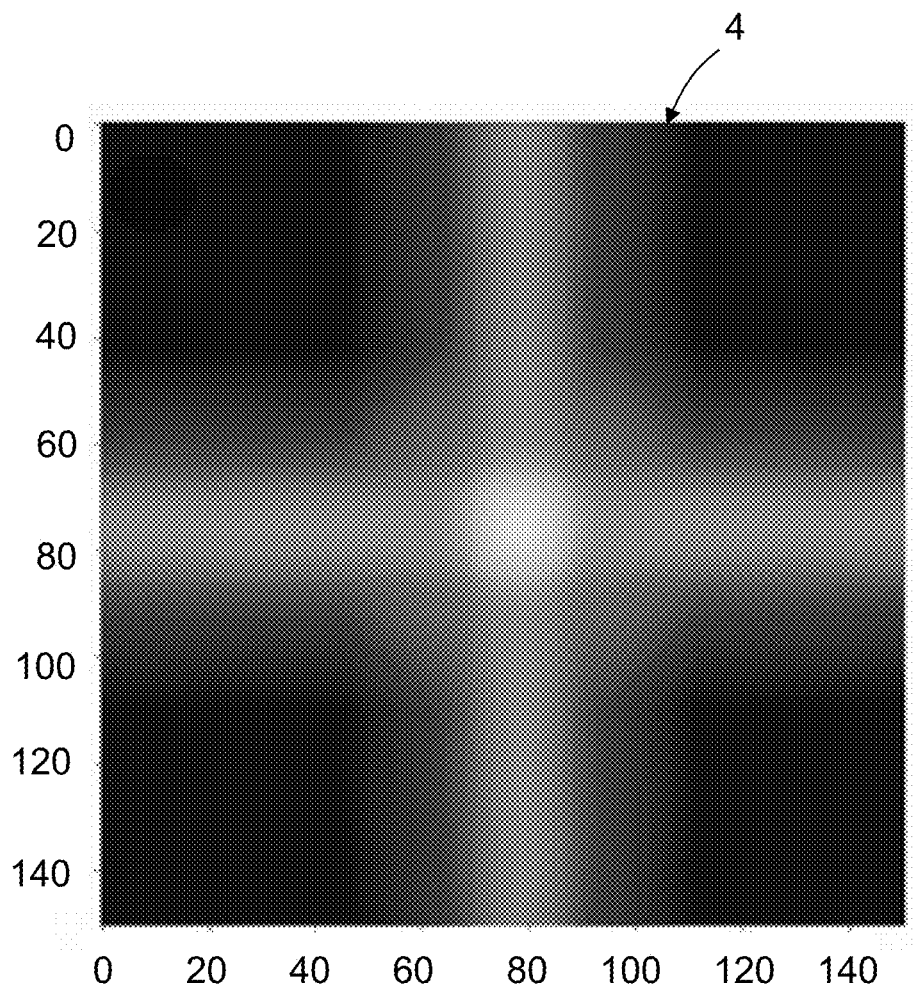
FIG. 9B is an image of a 2-D array resulting from template matching in which larger values (the lighter regions) indicate a greater degree of match to the template.
Figure 9C:
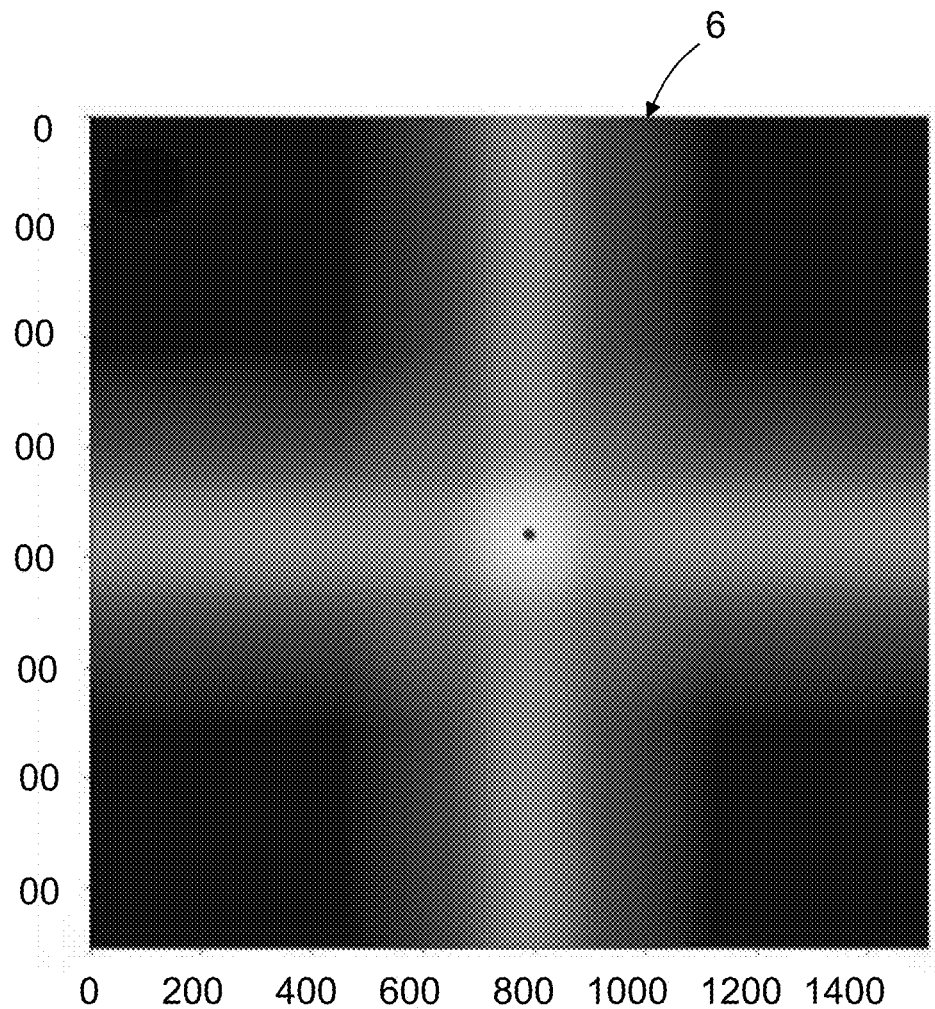
FIG. 9C is an image of an array interpolated to a grid 10× finer than the original incoming scanned plot image resolution along with the resulting subpixel precision estimate of the intersection center's location (indicated by a dot).

FIG. 9A is an image of a graded cross-shaped kernel 26 which serves as the template in the template matching step 502 of the process 500 for test plots having orthogonal grids with cross-shaped intersections. FIG. 9B is an image of a 2-D metric array 2 resulting from template matching in which larger values (the lighter regions) indicate a greater degree of match to the template. FIG. 9C is an image of a 2-D metric array 4 interpolated to a grid 10× finer than the original incoming scanned plot image resolution along with the resulting subpixel precision estimate of the intersection center's location (indicated by a black dot in FIG. 9C).

Once the computer vision process has returned high-precision measurements of the locations of intersection centers for a given test plot scan image, the system proceeds to align the resulting array of measured intersection (vertex) locations to an array of specified intersection (vertex) locations of the nominal grid. This step enables correction for systemic deviations from nominal positions due to any rotations or shifts that might have occurred when the printing medium for the test plot was fixtured for scanning. The optimal transformation for aligning the measured intersection (vertex) locations to the nominal grid is determined by applying the Kabsch algorithm. The Kabsch algorithm works in three steps: a translation, the computation of a covariance array, and the computation of the optimal rotation matrix. Specifically, the computer vision algorithm includes code that compute the optimal rotation array as follows:

- Shift the measured intersection (vertex) locations grid to the origin (0, 0) of the frame of reference by subtracting the measured intersection (vertex) location closest to the origin from each measured intersection (vertex) location in the grid.
- Construct the cross-covariance matrix H of the measured intersection (vertex) locations and the nominal grid as $H=P^TQ$, where P is the matrix (array) of measured intersection (vertex) locations and Q is the matrix (array) containing the specified intersection (vertex) locations of the nominal grid.
- Calculate the singular value decomposition of H as $H=USV^T$. In linear algebra, the singular value decomposition is a factorization of a real or complex array that generalizes the eigendecomposition of a square normal array to any m×n array via an extension of the polar decomposition. Specifically, the singular value decomposition of an m×n real array H is a factorization of the form $USV^T$, where U is an m×m real orthonormal array, S is an m×n rectangular diagonal array with non-negative real numbers on the diagonal, and V is an n×n real orthonormal array.

The optimal rotation matrix is then given by $R=VU^T$.

Once the optimal rotation array has been computed, the computer vision algorithm applies the optimal rotation array to the array of measured intersection (vertex) locations.

The final step in the system's image processing is the measurement of the positional differences between each measured intersection (vertex) location and its corresponding specified (intended) position (step 122 in FIGS. 3 and 5). Computing the pairwise differences is very simple—after the optimal rotation has been applied to the 2-D array of measured intersection (vertex) locations, the closest point to each transformed intersection location is its corresponding point in the nominal grid. Thus, for each transformed measured intersection (vertex) location, the distance between that point and the specified location of the nearest point in the nominal grid can be easily computed based on their respective position coordinates in the 2-D coordinate system of the frame of reference.

The final component of the system proposed herein for assessing a plotter system's positional accuracy is a statistical analysis (step 124 in FIG. 3) of the deviations from the specified locations as measured by the HAP image processing procedure (step 116 in FIG. 3). This analysis can take several forms depending on the nature of the plotter accuracy requirements. The simplest form of analysis is examining the distribution of deviations without considering any spatial structure. Specifically, if one were to construct a statistical confidence interval (say a 95% confidence interval) about the mean of this distribution, one can determine if the plotter system meets a requirement on overall positional accuracy. For example, if the plotter is required to have positional accuracy within ±0.02 inch with 95% confidence, one can compare the confidence interval for the mean of our distribution directly to the requirement and can determine if the requirement is met.

Figure 10:
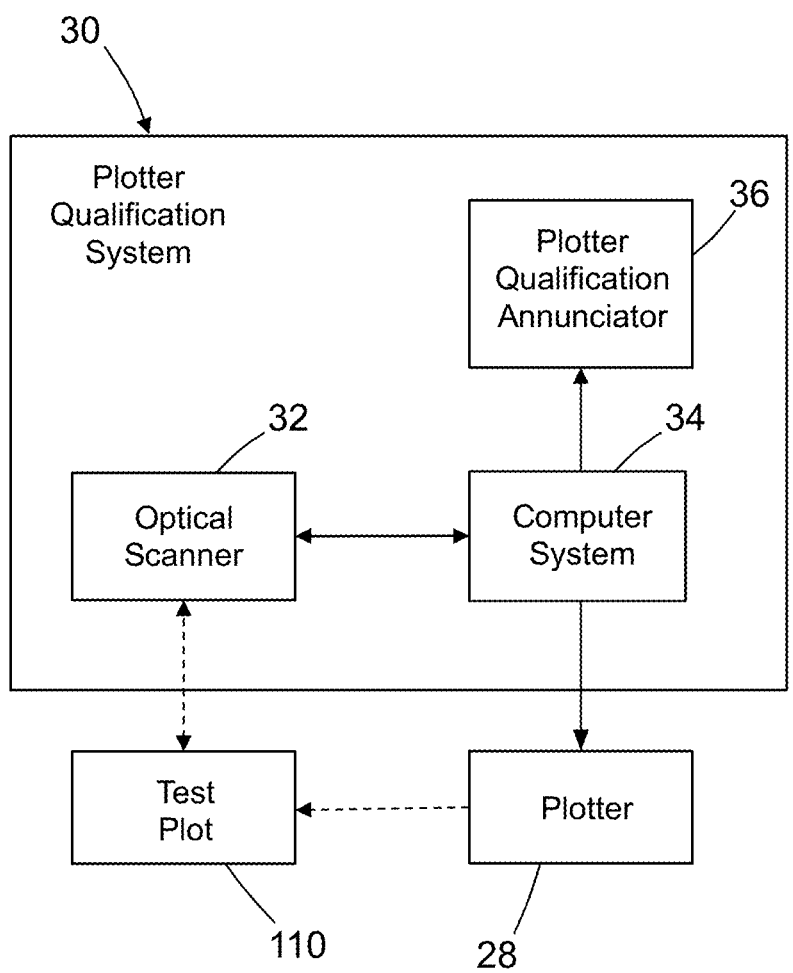
FIG. 10 is a block diagram identifying components of a system for measuring the positional accuracy of a plotter in accordance with one embodiment.

FIG. 10 is a diagram identifying components of a plotter qualification system 30 for measuring the positional accuracy of a plotter 28 in accordance with one embodiment. The plotter qualification system 30 includes an optical scanner 32 configured to acquire a set of pixel data representing an image of a test plot 110 that includes a printed grid having intersections or vertices at respective locations on a printing medium. In accordance with some embodiments, the optical scanner 32 may include an image sensor mounted on an electromechanical scanner. The image sensor may be a photo-sensor or photo-detector array, a CCD image sensor, a CMOS image sensor, etc.

The plotter qualification system 30 further includes a computer system 34 which is communicatively coupled to receive the test plot image from the optical scanner 32. The computer system 34 is configured (programmed) with image processing algorithms for calculating pairwise positional deviations of measured locations of the centers of intersections or vertices of the printed grid from specified locations of the centers of intersections or vertices of a nominal grid. One of the image processing algorithms is a Hough transform algorithm configured to find in the image geometric features which surround the intersections or vertices. Another image processing algorithm is a template matching algorithm configured to find the centers of the intersections or vertices using an intersection- or vertex-shaped kernel. A third image processing algorithm is a position interpolation algorithm configured to calculate coordinates of the measured location of the center of the intersection or vertex with subpixel resolution.

The computer system 32 is further programmed to perform a statistical analysis which constructs a confidence interval regarding an estimated mean positional deviation. More specifically, the computer system 32 is configured to determine whether this estimate (prediction) of mean deviation and its associated confidence interval are sufficient to satisfy the positional accuracy requirement or not. If a determination is made that the prediction is sufficient, then the computer system 32 sends a command to activate a plotter qualification annunciator 36, which visibly or audibly announces to the system operator that the plotter under test is categorized as having qualified positional accuracy.

Figure 11:
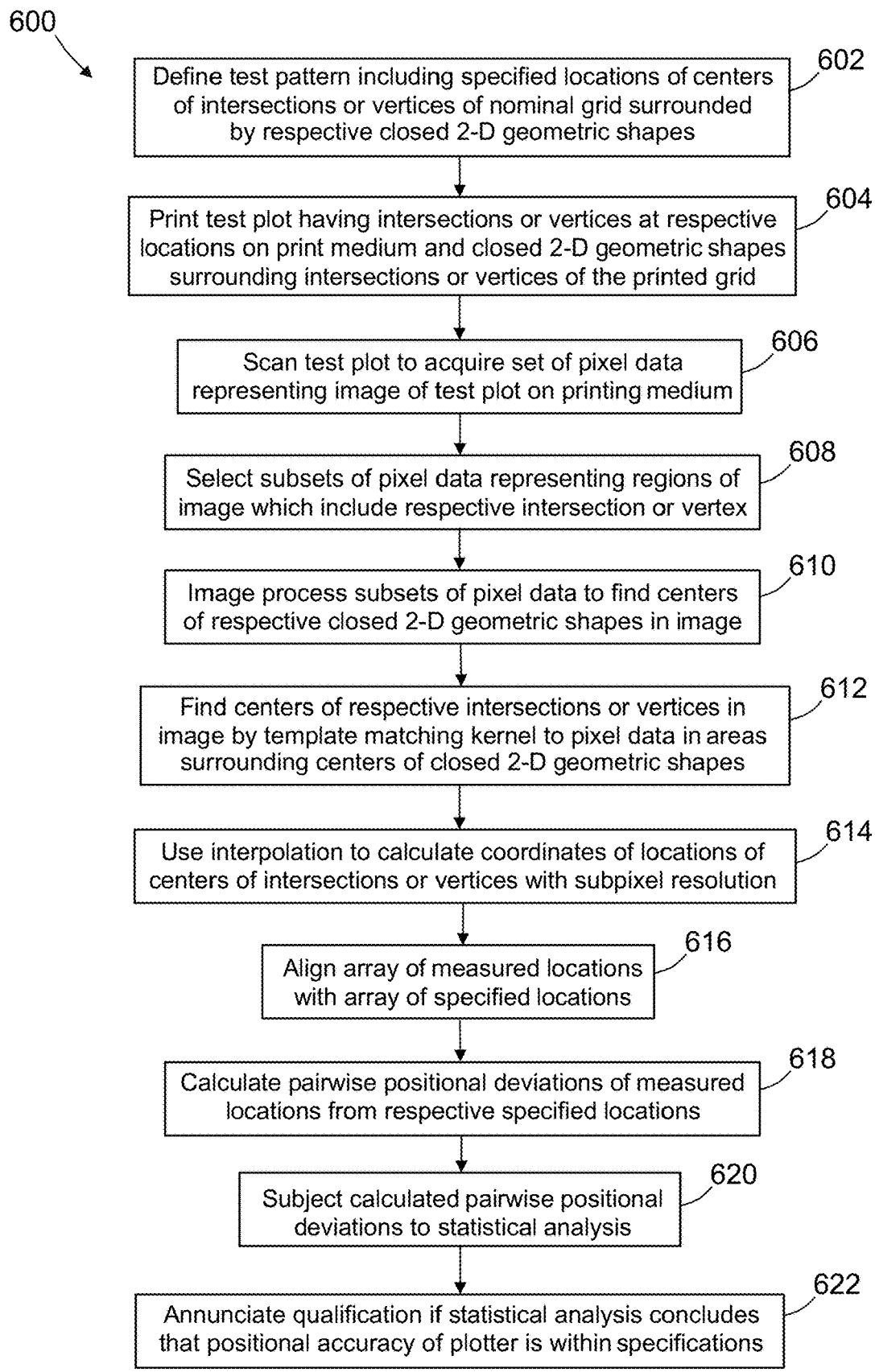
FIG. 11 is a flowchart identifying steps of a method for qualifying a plotter in accordance with one embodiment.

The image processing algorithms disclosed herein may also be employed in a method for qualifying a plotter. FIG. 11 is a flowchart identifying steps of a method 600 for qualifying a plotter in accordance with one embodiment. Initially, a test pattern is defined by generating digital data representing specified locations of centers of intersections or vertices of a nominal grid in a frame of reference and further representing a multiplicity of geometric features which respectively surround the intersections or vertices of the nominal grid (step 602). In response to a command to print the test pattern, the plotter under test prints a test plot that includes a printed grid having intersections or vertices at respective locations on a printing medium and further includes geometric features which respectively surround the intersections or vertices of the printed grid (step 604). That test plot is then scanned to acquire a set of pixel data representing an image of the test plot on the printing medium (step 606). Respective subsets of pixel data representing respective regions of the image which include a respective intersection or vertex are selected (step 608). Those subsets of pixel data then undergo image processing to find centers of respective geometric features in the image (step 610). For example, a Hough transform algorithm may be used in step 610. Thereafter, centers of respective intersections or vertices in the image are found by template matching an intersection- or vertex-shaped kernel to the pixel data in areas surrounding the centers of respective geometric features found in step 610 (step 612). Then interpolation is used to calculate coordinates of the locations of the centers of the intersections or vertices found in step 612 with subpixel resolution in the frame of reference (step 614), thereby deriving measured locations which are organized in a 2-D array (matrix). The array of measured locations is then aligned with a 2-D array that includes the specified locations (step 616). For example, a Kabsch algorithm may be used in step 616. Next pairwise positional deviations of the measured locations from respective specified locations are calculated (step 618). The collection of calculated pairwise positional deviations are then subjected to a statistical analysis which constructs a confidence interval regarding an estimated mean positional deviation (step 620). If the statistical analysis concludes that the positional accuracy of the plotter is within specifications, qualification of the plotter is annunciated (step 622). For example, symbology indicating that the plotter has passed the test is presented on a display screen.

Figure 12:
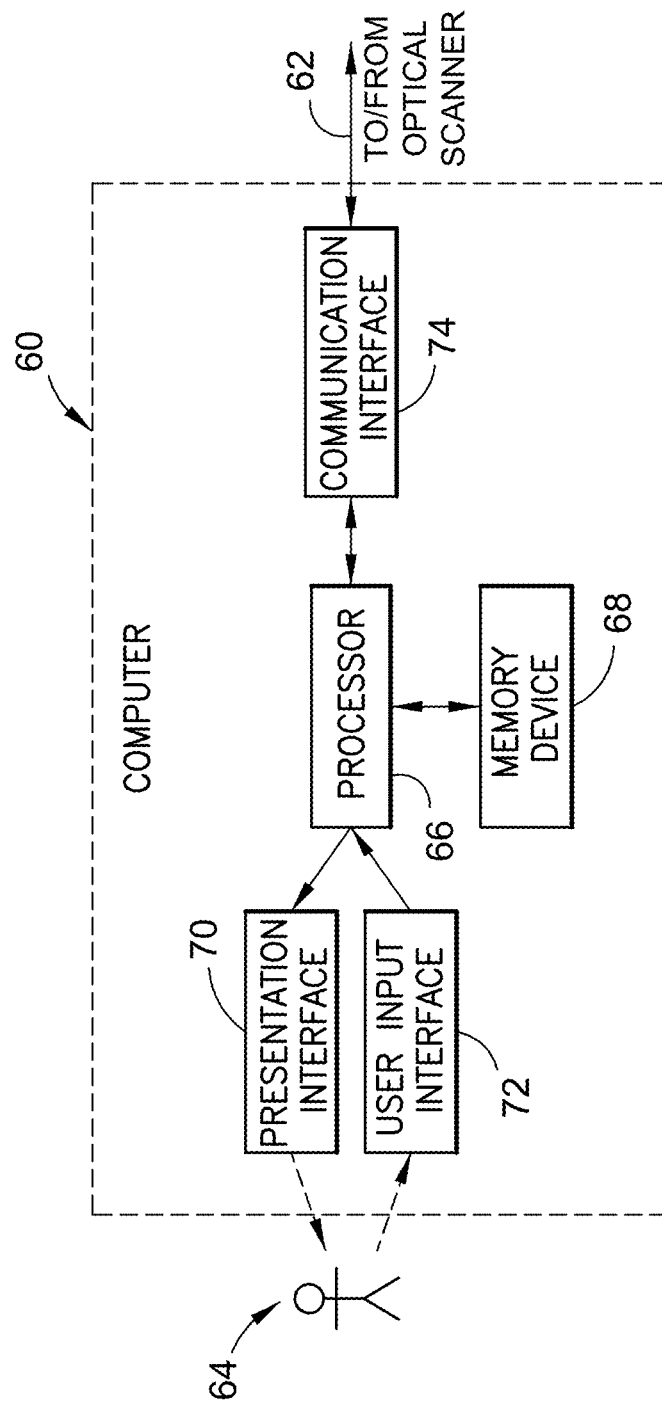
FIG. 12 is a block diagram identifying components of a computer that may be configured (programmed) to perform the data processing functions described herein.

FIG. 12 is a block diagram identifying components of a computer 60 that may be configured (programmed) to perform the data processing functions described herein. The computer 60 includes at least one memory device 68 and a processor 66 that is communicatively coupled to memory device 68 for executing instructions. In some implementations, executable instructions are stored in memory device 68. In the example implementation, computer 60 may be configured to perform one or more operations described herein by programming processor 66. For example, processor 66 may be programmed by encoding an operation as one or more executable instructions and by storing the executable instructions in memory device 68. The memory device 68 includes a non-transitory tangible computer-readable storage medium.

Processor 66 may include one or more processing units (e.g., in a multi-core configuration). Further, processor 66 may be implemented using one or more heterogeneous processor systems in which a main processor is present with secondary processors on a single chip. In another illustrative example, processor 66 may be a symmetric multi-processor system containing multiple processors of the same type. Further, processor 66 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the example implementation, memory device 68 is one or more devices that enable information such as executable instructions and/or other data to be stored and retrieved. Memory device 68 may include one or more computer-readable media, such as, without limitation, dynamic random access memory, static random access memory, a solid-state disk, and/or a hard disk. Memory device 68 may be configured to store, without limitation, application source code, application object code, source code portions of interest, object code portions of interest, configuration data, execution events and/or any other type of data.

In the example implementation, computer 60 includes a presentation interface 70 that is communicatively coupled to processor 66. Presentation interface 70 presents information to a system operator 64. For example, presentation interface 70 may include a display adapter (not shown) that may be coupled to a display device (e.g., plotter qualification annunciator 36 identified in FIG. 10), such as a cathode ray tube, a liquid crystal display, an organic light-emitting diode display, and/or an "electronic ink" display.

In the example implementation, computer 60 further includes a user input interface 72. User input interface 72 is communicatively coupled to processor 66 and receives input from system operator 64. User input interface 72 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 70 and user input interface 72.

Computer 60, in the example implementation, includes a communication interface 74 communicatively coupled to processor 66. Communication interface 74 communicates with one or more remote devices, e.g., optical scanner 32 shown in FIG. 10. To communicate with remote devices, communication interface 74 may include, for example, a wired network adapter, a wireless network adapter, and/or a mobile telecommunications adapter.

Assessment of positional accuracy of high accuracy plotter systems can be very challenging, particularly given the stringent requirements of the aerospace industry. As the current approach consists of laborious manual measurement which is expensive and ergonomically taxing, the automated solution proposed herein can help accelerate plotter assessments (in the context of qualification, for example) and alleviate the strain on technicians performing manual measurements.

An automated system for determining the positional accuracy of plotters could be useful for manufacturing companies (both aerospace and general industry) that use high-accuracy plotters for producing, for example, drilling templates. Perhaps more likely, plotter original equipment manufacturers may use the technology disclosed herein to reduce the overhead associated with qualifying their plotter systems, providing potential competitive advantage. By vastly increasing the number of positional accuracy measurements that can be conducted, quality control personnel can be confident that product specifications have been truly met. Moreover, this technology will save a large number of labor hours. Further, there is the possibility that the software and test plot combination described herein might be appropriate for use in production and not only qualification, which would reduce recurring manual measurement burden.

While systems and methods for measuring the positional accuracy of a plotting device using computer vision technology have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular embodiments disclosed herein.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program which is readable by the processing unit. As used herein, the term "optical scanner" should be construed broadly to encompass a single camera or multiple cameras having at least partially overlapping fields of view.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the specification specifies or the claim language states conditions indicating a particular order in which some or all of those steps are performed. Nor should the method claims be construed to exclude any portions of two or more steps being performed concurrently or alternatingly unless the claim language explicitly states a condition that precludes such an interpretation.

As used in the appended claims, the term "grid" should be construed to encompass an orthogonal (square) grid, a parallelogram grid, a triangular grid, a hexagonal grid, and equivalent grids; and the term "geometric feature" should be construed to include a closed curved line or a closed chain of straight line segments or a pattern of radiating lines or a series of dots or any other geometric feature that makes identifying the rough location of the intersection or vertex readily apparent to the image processing. The category of closed curved lines includes but is not limited to circles and ellipses; the category of closed chains includes but is not limited to triangles, squares, rectangles, pentagons, hexagons, octagons, etc.

The invention claimed is:

1. A method for measuring positional accuracy of a plotter, the method comprising:
   (a) defining a test pattern by generating digital data representing a nominal grid comprising intersections or vertices having centers at specified locations in a frame of reference augmented by geometric features which respectively surround the intersections or vertices;
   (b) printing a test plot that includes a printed grid having intersections or vertices at respective locations and respectively surrounded by geometric features on a printing medium;
   (c) scanning the test plot to acquire a set of pixel data representing an image of the test plot on the printing medium;
   (d) selecting a subset of pixel data representing a region of the image which includes an intersection or vertex and a geometric feature;
   (e) image processing the subset of pixel data to derive a measured location of a center of the intersection or vertex in the region in the frame of reference; and
   (f) calculating a pairwise positional deviation of the measured location from a corresponding one of the specified locations,
   wherein the geometric features are closed 2-D geometric shapes that respectively surround the intersections or vertices of the nominal grid.

2. The method as recited in claim 1, wherein the geometric features make identifying the rough location of the intersections or vertices readily apparent to the image processing.

3. The method as recited in claim 1, wherein the nominal grid comprises a data structure that defines a first set of mutually parallel, regularly spaced lines and a second set of mutually parallel, regularly spaced lines which intersect the first set at intersections.

4. The method as recited in claim 1, wherein the nominal grid comprises a data structure that defines a multiplicity of line segments which meet at vertices.

5. The method as recited in claim 1, wherein steps (d) through (f) are repeated to produce a collection of calculated pairwise positional deviations for a multiplicity of intersections or vertices.

6. The method as recited in claim 5, further comprising:
   (g) constructing a first array containing data representing the specified locations;
   (h) constructing a second array containing data representing the measured locations; and
   (i) aligning the data in the first array with the data in the second array.

7. The method as recited in claim 6, wherein step (i) comprises correcting for any rotation due to fixturing of the printing medium in step (c).

8. The method as recited in claim 1, further comprising subjecting the collection of calculated pairwise positional deviations to a statistical analysis which constructs a confidence interval regarding an estimated mean positional deviation.

9. The method as recited in claim 1, further comprising verifying that the positional accuracy of the test plot produced by the plotter system is within the specified threshold for positional accuracy, and thereafter assigning the plotter system that yields a test plot within the specified threshold a qualification for plotting part templates, and further comprising the step of utilizing the qualified plotter system by sending a part template file to the plotter system and using the qualified plotter system to plot a template part on the qualified plotter system.

10. A method for measuring positional accuracy of a plotter, the method comprising:
    (a) defining a test pattern by generating digital data representing specified locations of centers of intersections or vertices of a nominal grid in a frame of reference;
    (b) printing a test plot that includes a printed grid having intersections or vertices at respective locations on a printing medium;
    (c) scanning the test plot to acquire a set of pixel data representing an image of the test plot on the printing medium;
    (d) selecting a subset of pixel data representing a region of the image which includes an intersection or vertex;
    (e) image processing the subset of pixel data to derive a measured location of a center of the intersection or vertex in the region in the frame of reference; and
    (f) calculating a pairwise positional deviation of the measured location from a corresponding one of the specified locations,
    wherein step (e) comprises finding a geometric feature using a Hough transform algorithm.

11. The method as recited in claim 10, wherein step (e) further comprises finding the center of the intersection or vertex corresponding to the geometric feature using template matching.

12. The method as recited in claim 11, wherein template matching comprises correlating pixel data with an intersection- or vertex-shaped kernel.

13. The method as recited in claim 11, wherein step (e) further comprises using interpolation to calculate coordinates of the location of the center of the intersection or vertex with subpixel resolution.

14. A method for measuring positional accuracy of a plotter, the method comprising:
(a) defining a test pattern by generating digital data representing specified locations of centers of intersections or vertices of a nominal grid in a frame of reference;
(b) printing a test plot that includes a printed grid having intersections or vertices at respective locations on a printing medium;
(c) scanning the test plot to acquire a set of pixel data representing an image of the test plot on the printing medium;
(d) selecting a subset of pixel data representing a region of the image which includes an intersection or vertex;
(e) image processing the subset of pixel data to derive a measured location of a center of the intersection or vertex in the region in the frame of reference; and
(f) calculating a pairwise positional deviation of the measured location from a corresponding one of the specified locations,
further comprising tuning a plurality of configurable parameters to generate tuned parameters for use in step (e).

15. A system for measuring positional accuracy of a plotter, the system comprising:
an optical scanner configured to acquire a set of pixel data representing an image of a printed grid having intersections or vertices at respective locations on a printing medium; and
a computer system which is communicatively coupled to receive the image from the optical scanner and programmed with image processing algorithms for calculating pairwise positional deviations of measured locations of the centers of intersections or vertices of the printed grid from specified locations of the centers of intersections or vertices of a nominal grid,
wherein a first one of the image processing algorithms is a Hough transform algorithm configured to find geometric features in the image.

16. The system as recited in claim 15, wherein a second one of the image processing algorithms is a template matching algorithm configured to find the centers of the intersections or vertices using an intersection- or vertex-shaped kernel.

17. The system as recited in claim 16, wherein a third one of the image processing algorithms is a position interpolation algorithm configured to calculate coordinates of the measured location of the center of the intersection or vertex with subpixel resolution.

18. The system as recited in claim 15, wherein the computer system is further programmed to verify that the positional accuracy of the test plot produced by the plotter system is within the specified threshold for positional accuracy, the plotter system that yields test plot within the specified threshold for positional accuracy is assigned a qualification for plotting part templates, and wherein the system is further configured for utilizing the plotter system to thereafter send a part template file to the plotter system and use the qualified plotter system to plot a template part on the qualified plotter system.

19. The system as recited in claim 15, wherein the computer system is further programmed to perform a statistical analysis which constructs a confidence interval regarding an estimated mean positional deviation.

20. A method for measuring positional accuracy of a plotter comprising:
(a) defining a test pattern by generating digital data representing specified locations of centers of intersections or vertices of a nominal grid in a frame of reference and further representing a multiplicity of geometric features which make identifying the rough location of the intersection readily apparent during image processing;
(b) printing a test plot that includes a printed grid having intersections or vertices at respective locations on a printing medium and further includes the geometric features;
(c) scanning the test plot to acquire a set of pixel data representing an image of the test plot on the printing medium;
(d) selecting respective subsets of pixel data representing respective regions of the image which include a respective intersection or vertex;
(e) image processing the subsets of pixel data to find respective geometric features in the image;
(f) finding centers of respective intersections or vertices in the image by template matching an intersection- or vertex-shaped kernel to the pixel data in areas including the respective geometric features found in step (e);
(g) using interpolation to calculate coordinates of the locations of the centers of the intersections or vertices found in step (f) with subpixel resolution in the frame of reference; and
(h) calculating pairwise positional deviations of the measured locations from respective ones of the specified locations.

21. The method as recited in claim 20, wherein the geometric features are closed 2-D geometric shapes that respectively surround the intersections or vertices of the nominal grid.

22. The method as recited in claim 20, wherein the geometric features are lines or series of dots that respectively radiate from the centers of the intersections or vertices of the nominal grid.

* * * * *